June 30, 1931.  R. S. SANFORD  1,812,022
BRAKE OPERATING MECHANISM
Filed May 16, 1928
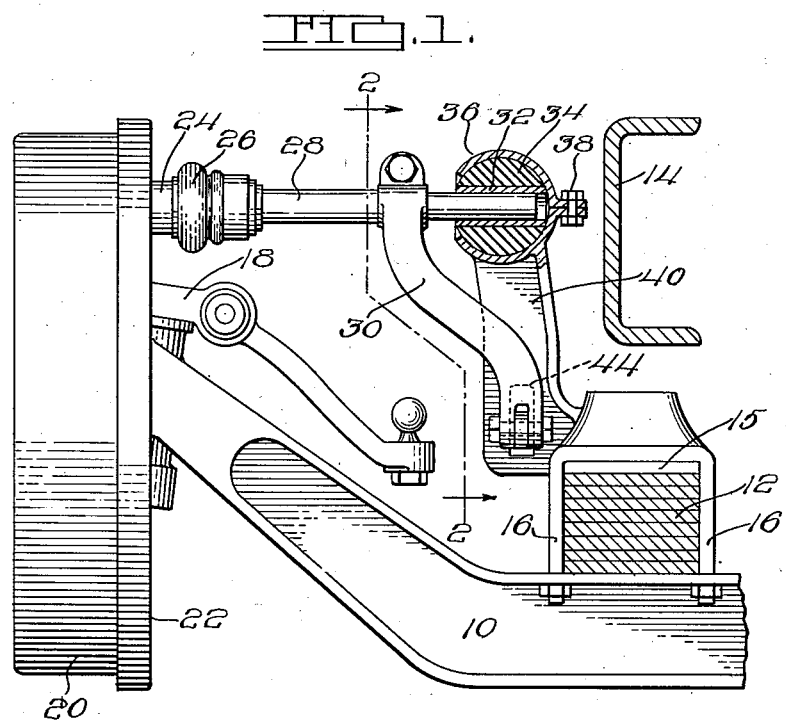
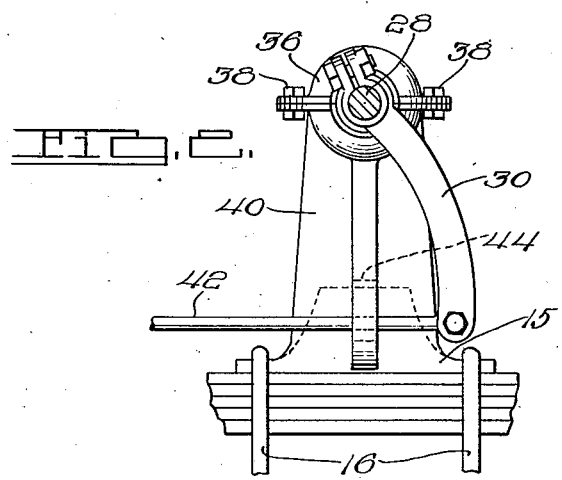
INVENTOR
Roy S. Sanford
BY
*M. W. McConkey*
ATTORNEY Patented June 30, 1931

1,812,022

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MECHANISM

Application filed May 16, 1928. Serial No. 278,099.

This invention relates to brakes and is illustrated as embodied in novel operating mechanism for a front wheel automobile brake. An object of the invention is to provide a simplified mounting for the operating mechanism.

One feature of the invention relates to the supporting of the end of the brake-applying shaft nearest the chassis frame, and opposite the usual universal joint through which the wheel end of the shaft operates the brake, in a support of resilient non-metallic material such as rubber, which will permit the slight "weaving" of the shaft due to changes in relative position on the parts of the chassis.

Another feature relates to minimizing the effect of the twisting or rolling of the front axle, when the brakes are applied, on the brake-operating mechanism by providing, directly under the shaft support and adjacent the upper outer edge of the spring, an opening in the shaft support through which the brake rod or its equivalent may pass. This brings the joint at the lower end of the brake lever approximately in the axis about which the axle tends to twist or roll when the brakes are applied. Preferably the support forms a part of the usual spring pad which is engaged by U-bolts or the like to secure the spring to the front axle.

The above and other objects and features of the invention, including various novel and desirable details of construction, will be apparent from the following description of one illustrative embodiment shown in the accompanying drawings, in which:

Figure 1 is a vertical transverse section through part of an automobile chassis showing the front brake and its operating mechanism in front elevation and partly broken away in central section; and Figure 2 is a partial section through the operating mechanism on the line 2—2 of Figure 1.

The illustrative arrangement includes the usual front axle 10, to which a spring 12 supporting a chassis frame 14 is attached by means such as the usual spring pad 15 held by U-bolts or the like 16. The front wheel knuckle 18 is swiveled by a king-pin or the like at one end of the front axle 10, and carries the front wheel (not shown) which is provided with a brake including a rotating drum 20 within which is arranged the friction means of the brake and which is closed at its open side by a support such as a backing plate 22 secured to the knuckle 18. The brake is operated by means such as a cam shaft 24 which is turned through a suitable universal joint 26 by an operating shaft 28 having an operating arm or lever 30.

According to one important feature of the invention, the end of the shaft 28 nearest the chassis frame 14 is slidably mounted in a metallic tube 32 pressed into a diametral opening in a ball 34 of resilient non-metallic material such as rubber, which can yield to permit a slight "weaving" of the shaft 28. The support 34 for the shaft is preferably held by a hemispherical cap 36 secured by means such as bolts 38 facing toward a hemispherical socket in the upper end of an arm 40 formed as an integral extension of the spring pad 15.

According to another feature of the invention, and in order to minimize the effect of the twisting or rolling of the axle 10 when the brakes are applied, the lever 30 is offset so that at its lower end there is a joint with an operating member such as a brake rod 42, which joint is immediately below the support 34 and immediately adjacent the upper edge of the spring 12 where it is approximately in the axis about which the axle tends to twist or roll when the brakes are applied.

To permit this arrangement the support 40 is formed with an opening 44 through which the brake rod 42 may pass.

While one illustrative embodiment of the invention has been described in detail, it is not my intention to limit its scope to that particular embodiment or otherwise than by the terms of the appended claims.

I claim:

1. Operating mechanism for a front automobile brake comprising an operating shaft having a universal joint at one end and a ball and socket supporting the other end, the ball being resilient and slidably receiving the shaft.

2. Operating mechanism for a front automobile brake comprising an operating shaft having a universal joint at one end, a resilient ball, a socket supporting the ball and a sleeve in the ball slidably receiving the other end of the shaft.

3. Operating mechanism for a front automobile brake comprising an operating shaft having a universal joint at one end, a support at the other end, a socket on the support, a resilient ball in the socket and a diametral sleeve in the ball receiving the shaft.

4. Operating mechanism for a front automobile brake comprising an operating shaft having a universal joint at one end, a support at the other end, a socket on the support, a rubber ball in the socket and a diametral sleeve in the ball receiving the shaft.

5. Operating mechanism for a brake arranged at one end of the axle of an automobile and comprising, in combination with the brake and axle, an operating shaft for the brake, and a support for the end of the shaft farthest from the brake including an upwardly extending member carried by the axle and a ball of resilient nonmetallic material carried by said member and supporting the end of the shaft.

6. Operating mechanism for a brake arranged at one end of the axle of an automobile and comprising, in combination with the brake and axle, an operating shaft for the brake, and a support for the end of the shaft farthest from the brake including an upwardly extending member carried by the axle and a ball of rubber carried by said member and supporting the end of the shaft.

7. A vehicle having, in combination, an axle and a brake adjacent one end of the axle and a spring engaging the axle, an operating shaft for the brake extending in the general direction of the axle away from the brake toward the spring, a device supporting the end of said shaft opposite the brake and which has a portion engaging the spring and serving as a spring pad, means engaging said pad and the axle and securing the spring to the axle, an operating lever for the shaft, and an operating connection for said lever extending through an opening in said member immediately below the support for the end of the shaft and immediately adjacent the upper edge of said spring.

In testimony whereof, I have hereunto signed my name.

ROY S. SANFORD.